Feb. 24, 1931. V. G. APPLE 1,793,986
DYNAMO ELECTRIC MACHINE ARMATURE
Filed June 14, 1928

INVENTOR.
Vincent G. Apple

Patented Feb. 24, 1931

1,793,986

UNITED STATES PATENT OFFICE

VINCENT G. APPLE, OF DAYTON, OHIO

DYNAMO-ELECTRIC-MACHINE ARMATURE

Application filed June 14, 1928. Serial No. 285,366.

My invention relates particularly to that type of dynamo electric machine armature having a commutator associated with the winding thereof and one object of my invention is to provide a commutator of more simple and less expensive construction which will be in effect a part of the winding rather than being separately built and attached thereto as in common practice.

Another object is to provide an armature having the windings and commutator encased in an armor of impervious insulating material to protect them against injury, the effect of oil, moisture, etc.

Other objects will become apparent to those skilled in the art from the following description when taken in conjunction with the drawings, wherein—

Similar numerals refer to similar parts throughout the several views.

Figure 1:
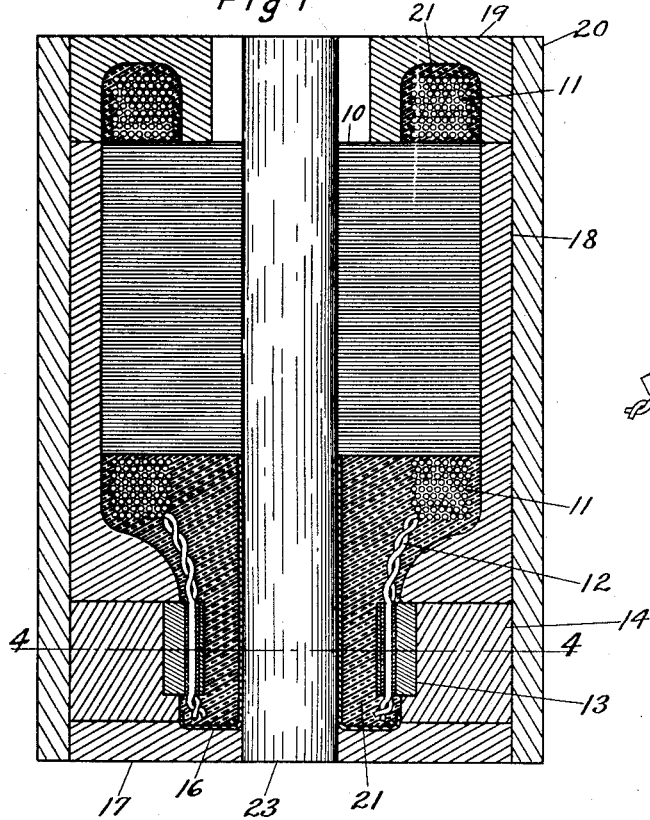
Fig. 1 is a longitudinal vertical cross section thru my armature and armature mold.

Referring to the drawings a plurality of laminæ 10 are cemented together to form a core. Windings 11 are laid in openings in the core as in ordinary practice, a suitable number of leads 12 each lead comprising two wires being allowed to extend from the windings. Commutator bars 13 corresponding in number to the number of leads are provided, a perspective view of a commutator bar being shown in Fig. 2. One bar 13 is placed between the two wires of each lead 12 and the leads are then twisted about the bar as shown in Fig. 3. The joints between the leads and bars may then be further improved by welding or otherwise. After each lead extending from the winding has attached thereto a commutator bar as in Fig. 3 the structure is placed in the mold as shown in Fig. 1 the procedure of placing the structure in the mold being about as follows:

First, ring 14 having a plurality of separating spacers 15, is placed upon the series of bars 13. A flanged ferrule 16 which becomes a part of the finished armature is placed in position on bottom 17 of the mold and the armature and ring 14 are placed thereon. Ring 18 is next placed about the armature, this ring being separated by cuts running lengthwise into three parts in order that the parts may be afterward radially removed from the armature. Ring 19 is next put in place and cylinder 20 brought down over the whole.

After the mold is thus assembled a fluid insulating material is poured or pumped in to fill all space within the mold not occupied by laminæ 10, windings 11, bars 13 and ferrule 16. The fluid insulating material is then hardened or allowed to harden by heat or otherwise to form a solid binding mass as at 21 which forms a rigid commutator of bars 13 and surrounds the windings 11 with an armor of insulating material and fills all voids therebetween. The ferrule 16 further protects the end of the armature against breakage.

Figure 2:
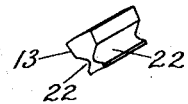
Fig. 2 is a perspective view of one of the commutator bars.
Figure 3:
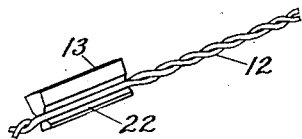
Fig. 3 shows a commutator bar and the manner in which the winding leads are attached.
Figure 4:
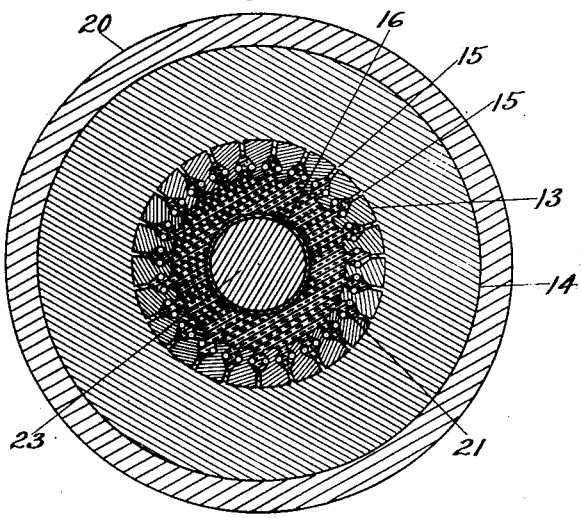
Fig. 4 is a cross section taken on line 4—4 of Fig. 1.

By reference to Figs. 2 and 4 it may be seen that grooves 22 extending lengthwise in bars 13 not only supply a place for leads 12 but form pockets into which insulation 21 may extend to bind the bars together against centrifugal action when under rotative speed.

When the mold is removed and spacers 15 thereby withdrawn the commutator will have corresponding spacers between the bars without the necessity of cutting away the spacers between the bars as is sometimes done in common practice to obtain this result.

The center piece 23 may be the permanent armature shaft but is preferably part of the mold. When piece 23 is a part of the mold it is pressed from the finished armature which then, because of the manner in which it is cemented together, becomes a self-sustaining unit and the shaft therefor is separately supplied and may be renewed when desired.

To remove the mold the rings and armature are first pressed endwise out of cylinder 20, then the three part ring 18 is radially removed. By then placing supports under rings 14 and 19 the armature may be endwise pressed therefrom.

Having described my invention, I claim—

1. A dynamo electric machine armature comprising a core, a winding comprising a plurality of turns of insulated wire thereon, leads each comprising two open ends of said winding extending at suitable intervals therefrom, commutator bars attached to the ends of said leads and a continuous mass of insulating impervious material penetrating the interstices of the winding and surrounding the structure to hold said windings and bars in proper position.

2. A dynamo electric machine armature comprising a core, a winding thereon, leads, each comprising a pair of open ends of said winding extending at suitable intervals therefrom, a commutator bar between each pair of said leads, a twisted portion of said leads at each end of the bars and a welded or similar joint holding said bars to said leads, and a continuous mass of insulating material surrounding the structure to hold said windings and bars in proper position.

3. A dynamo electric machine armature comprising a core, a winding on said core, leads each consisting of a pair of wires extending from the winding at proper intervals, and commutator segments grooved lengthwise at each side, attached one to each said lead by straight parts of the wire of a pair extending one wire on each side of the segment in the said grooves and by twisted parts of the wires of a pair at the ends of the segments.

4. A dynamo electric machine armature comprising, a core, a winding on said core, lead wires emanating from said winding in pairs, a grooved commutator segment held between the two members of each pair, straight parts of the wires extending through the grooves, and twisted parts of the wires at each end of the segment.

5. A dynamo electric machine armature comprising a core, a winding on said core, lead wires emanating from said winding in pairs, a grooved commutator segment held between the two members of each pair, straight parts of pairs of wires in the said grooves, twisted parts of pairs of wires at the ends of the segments, and a body of molded insulation extending between and about the segments, and twisted leads to compose a commutator.

6. A dynamo electric machine armature comprising a core, a winding on said core, pairs of wires terminating from said winding at suitable intervals, a commutator segment having a longitudinal groove in each side held between the two wires of each pair, twisted parts of the pairs of said wires at the ends of the segments, a body of molded insulation extending between and about the segments, and a metal cap covering the end and a part of the diameter of said insulation mass.

7. A dynamo electric machine armature comprising, a core, a winding on said core and extending axially beyond, pairs of wires extending from said winding at intervals around the circumference, a commutator segment having a longitudinal groove in each side held between the two wires of each pair, twisted parts of the pairs of said wires at the ends of the segments, and means covering and supporting said winding and supporting said bars, said means consisting of a single mass of insulation molded in situ through and about said winding and between and about said bars and said twisted ends.

8. A dynamo electric machine armature comprising, a core, a winding on said core and extending axially beyond, pairs of wires extending from said winding at intervals around the circumference, a commutator segment between each pair of wires, twisted parts of said pairs at the ends of the segments, a metal cap at the outer ends of said segments covering and surrounding but not touching said twisted ends, and a continuous mass of insulation molded in situ through and about the winding, between and about the segments and between the said twisted ends and the said metal cap.

In testimony whereof I hereunto set my hand.

VINCENT G. APPLE.